United States Patent
Kumakiri et al.

[11] Patent Number: 6,068,110
[45] Date of Patent: May 30, 2000

[54] HOLDER FOR CYLINDRICAL CELL IN CONVEYOR SYSTEM

[75] Inventors: Hideyuki Kumakiri, Chigasaki; Masaharu Miyahisa, Fujisawa, both of Japan; Haruo Tanimura, Columbus, Ga.; Saburo Nakatsuka, Kyoto, Japan

[73] Assignee: Matsushita Electric Industrial Co., Ltd., Osaka, Japan

[21] Appl. No.: 08/922,281

[22] Filed: Sep. 3, 1997

[30] Foreign Application Priority Data

Sep. 6, 1996 [JP] Japan ..................... 8-235697

[51] Int. Cl.[7] .................................................. B65G 17/32
[52] U.S. Cl. ................. 198/803.14; 198/867.12
[58] Field of Search ................ 198/803.14, 803.15, 198/867.01, 867.11, 867.12

[56] References Cited

U.S. PATENT DOCUMENTS

| | | | |
|---|---|---|---|
| 2,953,970 | 9/1960 | Maynard | 279/128 |
| 3,285,456 | 11/1966 | Pewitt | 215/100.5 |
| 3,320,564 | 5/1967 | Sosey et al. | 269/8 |
| 3,941,237 | 3/1976 | MacGregor et al. | |
| 4,807,421 | 2/1989 | Araki et al. | 198/803.15 |
| 5,484,052 | 1/1996 | Pawloski et al. | 198/803.14 |
| 5,799,934 | 9/1998 | Kouda et al. | 198/803.14 |

FOREIGN PATENT DOCUMENTS

| | | |
|---|---|---|
| 0209064 | of 0000 | European Pat. Off. . |
| 0721227 | of 0000 | European Pat. Off. . |
| 0727367 | of 0000 | European Pat. Off. . |
| 2557356 | 3/1977 | Germany ............. 198/803.14 |
| 2001027 | of 0000 | United Kingdom . |
| 9530611 | of 0000 | WIPO . |

*Primary Examiner*—Christopher P. Ellis
*Assistant Examiner*—Khoi H. Tran
*Attorney, Agent, or Firm*—Price Gess & Ubell

[57] ABSTRACT

A conveying holder for cylindrical cell is provided which is capable of stably supporting a cylindrical cell irrespective of variation in outer diameter of the cell or impact during transfer. An outer wall member 20 of which inner diameter is greater than the diameter of a cylindrical cell 7 is provided. A plurality of elastic inner wall portions 21 are concentrically arranged to have a distance from the inner side of the outer wall member 20, each elastic inner wall portion joined at both ends to the outer wall member 20. A cell holding portion 22 is provided projecting inwardly from the inner side of each elastic inner wall portion 21 and having a cell holding surface 29 thereof corresponding in shape to the outer side of the cylindrical cell 7. The cell holding surfaces 29 are arranged along a concentric circle which is smaller in diameter than the cylindrical cell 7 so that they can hold the cylindrical cell 7 in-between under pressure.

6 Claims, 4 Drawing Sheets

HOLDER FOR CYLINDRICAL CELL IN CONVEYOR SYSTEM

BACKGROUND OF THE INVENTION

1. Technical Field of the Invention

The present invention relates to a conveying holder for a cylindrical cell being manufactured in an assembling process, which determines the orientation of the cell and conveys the cell while supporting it in an upright state.

2. Description of Related Arts

As the demand for batteries is now increasing sharply, it is desired to produce a great amount of batteries while maintaining their quality level as well as reliability. In a process of manufacturing batteries, unfinished batteries are carried by a known conveyor system from one step to another for filling a cell housing with an electrode assembly, pouring an electrolyte, applying a sealer, closing the cell housing with a sealing member, and so on. In the above mentioned processes, cell housings are held in their upright state by a conveying holder for a series of the steps. Such a conveying holder may be used to hold a cell housing, an in-process cell, or a finished cell product at each step for precise positioning. For simplifying the description and understanding, they are all hereinafter referred to as 'cell' in this specification.

One of the known conveying holders for the above described purpose is typically shown in FIG. 6. The conveying holder is particularly designed for holding a common cylindrical cell produced in mass production and consists mainly of two holder shells 1a and 1b which are fabricated by separating a synthetic resin cylinder, of which the inner diameter is slightly smaller than the outer diameter of the cell, into two segments on a plane including the axial center thereof. The two holder shells 1a and 1b are joined in opposite relationship to each other by an O-ring tension spring member 3, which is fitted into holder grooves 2 provided on the outer sides of the shells 1a and 1b, so that there is a small gap 1c between the two holder shells 1a and 1b constituting substantially a tubular assembly. The conveying holder allows the cell to be securely held in an upright state in a holding space between its shells 1a and 1b with the help of an urging force of the tension spring member 3.

In some steps, the cell has to be located in a given direction. For precise positioning, one of the holder shells 1a and 1b of the conveying holder shown in FIG. 6 has a recessed surface 4 provided on an outer side thereof at one end opposite to the opening end through which the cell is inserted. More specifically, the cell may be loaded into the conveying holder with its lead extending from an electrode plate being positioned with respect to the recessed surface 4. In each step of the production, the cell in the conveying holder can automatically be orientated by detection of the recessed surface 4.

Also, a cell positioning conveyor means is proposed for improving the productivity of batteries as shown in FIG. 7. The cell positioning conveyor means includes a cell conveying carrier 8 of cylindrical shape for holding a cell 7 in its upright state which has been loaded from an upper opening of the carrier 8 during the production. The cell conveying carrier 8 has a locator recession 9, similar to the recessed surface 4 shown in FIG. 6, provided on an outer side thereof close to the lower end. The recession 9 is used for positioning a cell 7 loaded into the conveying carrier 8 in its upright state. In action, the conveying carrier 8 holding the cell 7 is conveyed in a forward direction denoted by a bold arrow along a conveyor system 11 while being guided from both sides by a pair of bar-like carrier guides 10.

In the above described conveying process, the conveying carrier 8 is transferred while experiencing a rotating force by a difference in friction between the pair of carrier guides 10. The conveyor system 11 includes a carrier slope 12 fixedly mounted thereon having a moderately tapering surface. While rotating, the conveying carrier 8 runs on the carrier slope 12, until its recession 9 comes into direct contact with a side of the carrier slope 12, whereby the conveying carrier 8 steps down and stands on the conveyor system 11. Since the recession 9 directly engages with the side of the carrier slope 12, the conveying carrier 8 is set in an angular position. This allows the cell 7 in the conveying carrier 8 to be automatically positioned and conveyed further while keeping its position.

It is, however, difficult for the cell conveying holder shown in FIG. 6 to have a true roundness of the cell holding space defined by the inner walls of the two holder shells 1a and 1b. Also, the two holder shells 1a and 1b are urged by the yielding force of the tension spring member 3 in a direction that they come closer to each other. Accordingly, the contacting condition between the cell and the holder shells 1a, 1b may greatly vary depending on a combination of the size of the cell holding space and the diameter of the cell.

Particularly, when the curvature radius of the two holder shells 1a and 1b is greater than that of the cell, the holder shells 1a and 1b come into contact with the cell at only two points in their respective center. If the curvature radius of the two holder shells 1a and 1b is smaller than that of the cell, the holder shells 1a and 1b touch the cell at four points at their respective ends. In the latter case, the direction of the pressing force exerted to the cell by the holder shells 1a and 1b differs from that of the pressing force exerted from the contacting four points between the holder shells 1a, 1b and the cell.

This causes the strength for holding the cell to be largely varied corresponding to variations of the contact points between the holder shells 1a, 1b and the cell and of the difference in the direction between the contact points and the pressing force, even if it is assumed that a variation in the yielding force of the tension spring member 3 is negligible. As it is impossible to stably support the cell, it is hardly attained to produce cells of required properties effectively.

Also, while the tension spring member 3 projects slightly from the outer sides of the holder shells 1a and 1b, the slit-like gap 1c is made between the two holder shells 1a and 1b of substantially semicircular shape in cross section arranged opposite to each other. This, together with the fact that the cells cannot be stably supported, may cause changes in the positions and posture of cells relative to the conveying holder, while the conveying holders supporting the cell in its upright state are slid with or collided against each other on a transfer conveyor in the manufacturing process or on a turn table for temporal storage of unfinished products. Also, due to the projection and the gap, the conveying holder itself may stick or stall in a feeder shoot or between the guides.

The cell positioning conveyor means of FIG. 7 is not capable of always holding the cell 7 stably, since the cell conveying carrier 8 simply has a tubular shape of which inner diameter may not always match the diameter of the cell 7. Besides, the cell conveying carrier 8 is moved forward with its recession 9 being slid with the carrier slope 12 for positioning. It is thus required that the cell conveying carrier 8 is continuously guided by the pair of carrier guides 10 of which frictional coefficients are different from each other for turning movements. In such an arrangement, the conveying carrier 8 often tilts or lifts up during the traveling, causing the forward movement of the cell conveying carrier 8 to be declined in both efficiency and stability.

BRIEF SUMMARY OF THE INVENTION

It is an object of the present invention to provide a conveying holder for supporting an electric cell of common cylindrical shape at high stability regardless of variation in the diameter of the cell or impact during the conveying action.

For achievement of the foregoing object, a conveying holder for cylindrical cell according to the present invention is provided with an outer wall member having an inner circumferential surface which is greater in diameter than the cylindrical cell; a plurality of elastic inner wall portions concentrically arranged with respect to the outer wall member and spaced from the inner circumferential surface of the outer wall member, each joined at both ends to the outer wall member; and a plurality of cell holding portions respectively projecting inwardly from an inner side of the elastic inner wall portions, each having a cell holding surface which corresponds to the contour of the cylindrical cell; in which the cylindrical cell is inserted into and tightly held between the cell holding surfaces arranged to position along a concentric circle having a smaller diameter than that of the cylindrical cell.

The conveying holder for cylindrical cell holds a cylindrical cell inserted therein with its cell holding surfaces in an upright state. More particularly, the elastic inner wall portions spaced by the distance from the outer wall member are outwardly urged by the insertion of the cell between the cell holding portions and elastically deformed radially towards the outer wall member. The elastic deformation of the elastic inner wall portions yields a repulsive force which causes the cell holding surfaces of the cell holding portions to press directly against the outer side of the cell. Accordingly, the cell is held at its outer side by the cell holding surfaces under pressure and maintained in its initial upright state.

Since the elastic inner wall portions are arranged along a circle concentric with the outer wall member in the conveying holder for the cylindrical cell, they equally receive the pressing force of the loaded cell and thus are deformed outwardly in radial directions toward the inner side of the outer wall member so that the circle defined by the elastic inner wall portions is increased in diameter. This permits the elastic inner wall portions to stay in a true circle of which the diameter is identical to that of the cell. Also, since the cell holding surfaces of the cell holding portions projecting inwardly from the inner side of their respective elastic inner wall portions come in direct contact with the cell, the contacting force of the cell holding surface is hardly affected by differences between the curvature of the arched cell holding surface and that of the outer side of the cell. As the elastic inner wall portions deform elastically, the corresponding cell holding portions are displaced radially of the outer wall member. The resilient force which holds the cell thus acts in accordance with the contacting force of the cell holding surface to the outer side of the cell.

Accordingly, while each of the cell holding surfaces comes in direct contact with the outer side of the cell in equal conditions regardless of variation in the outer diameter of the cell, both the contacting and pressing force from each cell holding surface are radially exerted to the outer side of the cell in accordance with each other. The cell can be thus held stably by the cell holding surfaces with uniform pressure.

It is preferable that three or more elastic inner wall portions of identical shape having their respective cell holding portions at the center on the inner side thereof are disposed at equal intervals along a circle being concentric with the outer wall member.

This allows the elastic inner wall portion to receive a pressing force from the cell inserted via the corresponding cell holding portion provided at the center of the concaved inner side of the elastic inner wall portion and thus deform uniformly towards the outer wall member. Three or more elastic inner wall portions which are concentrically arranged at equal intervals permit the corresponding cell holding surfaces of the cell holding portions to press the outer side of the cell at three or more different locations spaced at equal intervals of an angle, hence ensuring the holding of the cell at its correct position with higher stability.

Also, the outer wall member may have deformation limiting bosses provided on the inner circumferential surface thereof, which are located radially opposite to the corresponding cell holding surfaces of the cell holding portions, each deformation limiting boss so projecting that a distal end thereof is spaced by a distance from the outer side of the corresponding elastic inner wall portion.

This allows the elastic inner wall portions to be prevented from partially over-deforming upon coming into contact with the projections when they have been dislocated outwardly towards the inner side of the outer wall member by a pressing force of the cell. It is thus prevented that the cell is accidentally inserted with its axis being extremely eccentric to the center of the conveying holder during the loading of the cell.

Preferably, the outer wall member may have a recessed surface for positioning which is formed by cutting off a part of the outer wall member in a groove in parallel with a tangential direction and distanced from one end of the outer wall member.

This allows the cell to be held at a specific position with respect to the conveying holder when loaded with its lead extending from a group of electrodes being positioned to the recessed surface. Also, when the conveying holder which is being rotated by a rotation applying means is automatically engaged with a positioning member such as a lever fitting into and pressing directly against the recessed surface, it can be positioned readily and definitely. The recessed surface is located on the outer side of the outer wall member and spaced from one end thereof so that the positioning member is coupled to securely hold the conveying holder in the direction of the axis of the holder. Accordingly, the conveying holder can be transferred in a correct orientation without the use of traditional guide bars.

It is also preferable that the recessed surface is provided in plurality at different points on the outer side of the outer wall member.

This allows the conveying holder to be correctly positioned in different directions with the use of positioning members which can engage with their corresponding recessed surfaces on the outer wall member.

Moreover, the outer wall member, the elastic inner wall portions, the cell holding portions, and the deformation limiting bosses may be integrally formed of synthetic resin by molding.

Accordingly, the conveying holder will be reduced in production cost and increased in dimensional accuracy and physical strength as compared to a conventional one which consists of elastic inner wall portions made of leaf spring or rubber materials and bonded in their respective locations to an outer wall member.

Further, the outer wall member may have a ring member or a disk made of ferromagnetic material being greater in specific gravity than synthetic resin and inserted at the vicinity of at least one end of the outer wall member.

When, for example, a magnetic conveyor is employed in the conveyor system for transferring the conveying holder, the conveying holder is securely held at a desired position by a magnetic force which acts on the ring member or disk of the conveying holder. The ring member or disk which is greater in specific gravity than the synthetic resin material is embedded in a lower region of the conveying holder, hence preventing the conveying holder from falling down.

Other and further objects, features and advantages of the invention will appear more fully from the following description.

DESCRIPTION OF PREFERRED EMBODIMENTS

Figure 1:
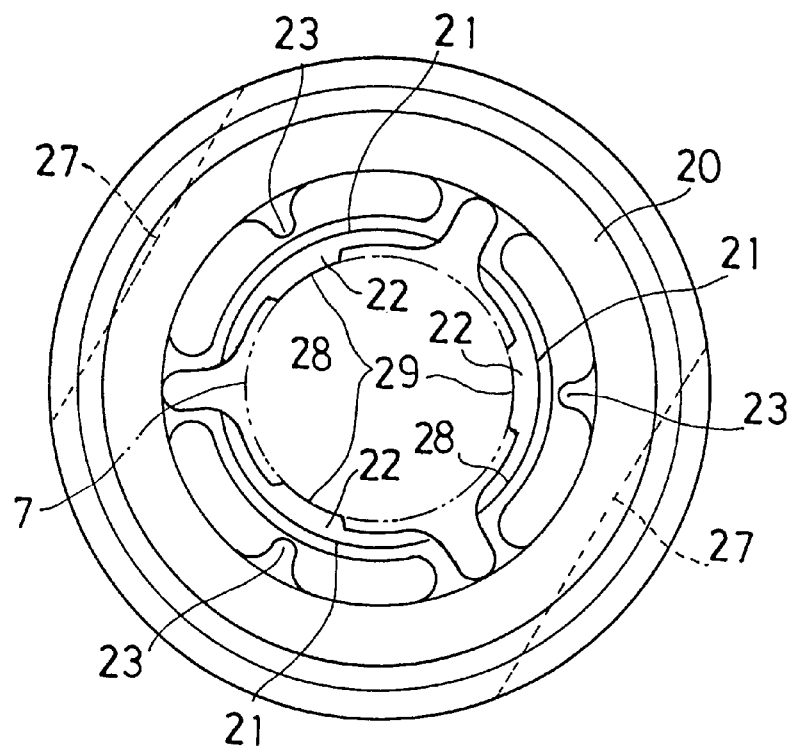
FIG. 1 is a plan view of a conveying holder for cylindrical cell according to one embodiment of the present invention.
Figure 2:
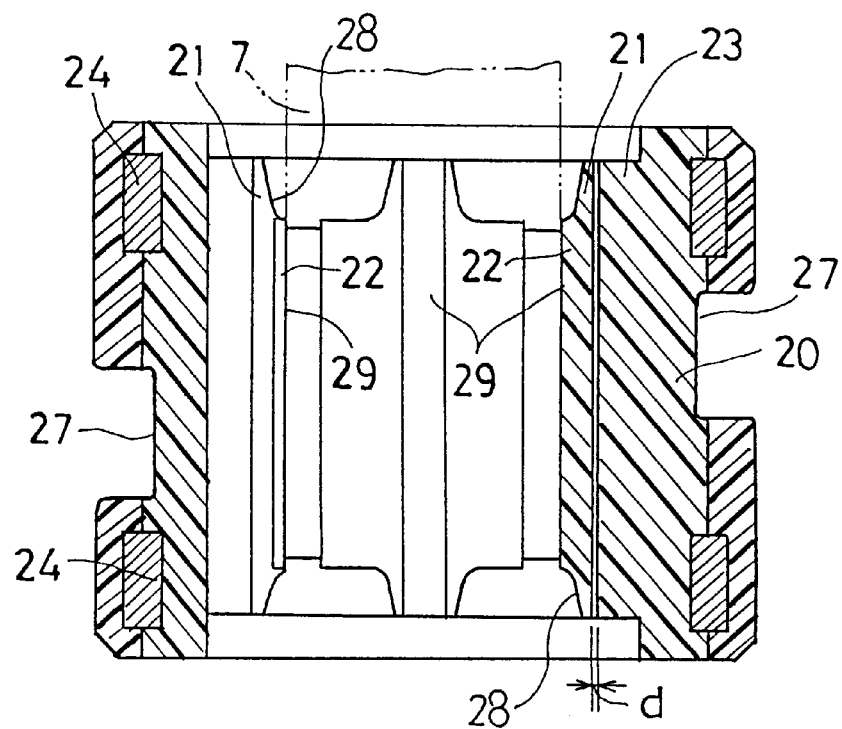
FIG. 2 is a longitudinal cross sectional view of the conveying holder.
Figure 3:
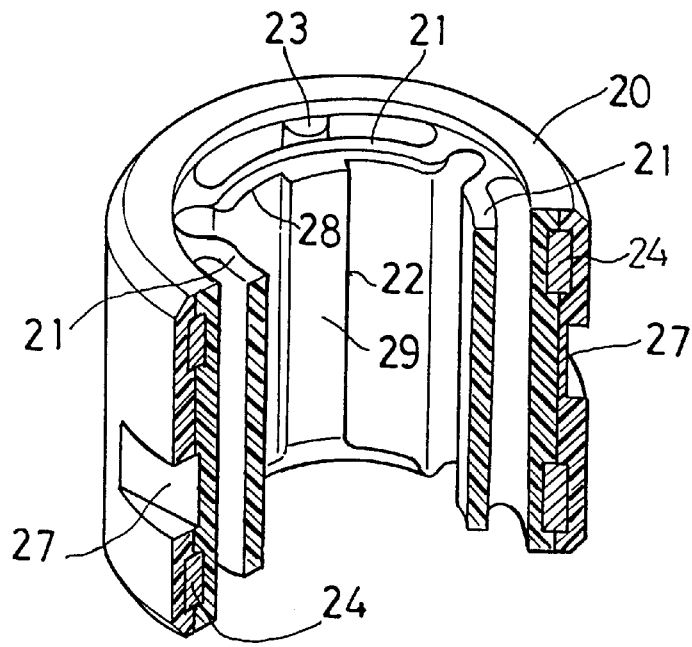
FIG. 3 is a partially cut-off perspective view of the conveying holder.

Preferred embodiments of the present invention will be described in more detail referring to the accompanying drawings. FIGS. 1 to 3 illustrate a conveying holder for holding a cylindrical cell according to one embodiment of the present invention. FIG. 1 is a plan view, FIG. 2 is a longitudinal cross sectional view, and FIG. 3 is a cut-off perspective view. As shown, the conveying holder or holder assembly comprises an outer wall member 20 of cylindrical shape, three inner wall elastic portions 21 of arcuate shape in cross section spaced at a certain distance from the inner side of the outer wall member 20 and disposed along a circle being concentric with the outer wall member 20, three cell holding portions 22, each projecting inwardly from a center of the inner side of the inner wall elastic portion 21, and three deformation limiting bosses 23, each projecting inwardly from the inner side of the outer wall member 20 towards the corresponding cell holding portion 22, which are all formed integrally of synthetic resin. The integral forming may be carried out by common injection forming of a thermal plastic resin material with less cost.

The outer wall member 20 is of tubular shape having a considerable thickness. A couple of ring members 24 are embedded in the outer wall member 20 proximately at either end thereof by an insert forming method. Thus, a resin forming step is repeated two times to complete the outer wall member 20 in order to insert the two ring members 24 as shown in FIGS. 2 and 3. The ring members 24 are made of ferromagnetic material which is greater in specific gravity than at least the resin material, and may be machined solids of mild steel. The two ring members 24 are equally spaced from their respective ends of the outer wall member 20 so as not to be tilted in a certain direction. In case that the outer wall member 20 is a tubular having a bottom and thus one end thereof is inevitably greater in weight than the other, a single disk member may be inserted in the vicinity of the bottom of the outer wall member 20 instead of the ring members 24.

The outer wall member 20 has two locator recessed surfaces 27 formed on both opposite sides thereof in a radial direction. The two recessed surfaces 27 are spaced by a distance from both ends of the outer wall member 20 respectively for preventing the conveying holder from having a directional quality. The recessed surface 27 is shaped to be groove-like indentation by notching off a part of the outer side of the outer wall member 20 in parallel with a tangential direction to have a flat bottom surface.

The three elastic inner wall portions 21 are identical in shape, i.e., a thin strip of a thickness of 0.4 to 1.2 mm having such an arcuate form in cross section as tailored by axially cutting into segments a tube of which inner diameter is substantially equal to the diameter of the cell to be held. The elastic inner wall portions 21 are concentrically disposed within the outer wall member 20 and joined or contacted at their respective ends concentrically to the outer wall member 20. Thus, the elastic inner wall portions 21 can elastically be deformed radially and outwardly towards the outer wall member 20 between the contact points with the outer wall member 20.

The elastic inner wall portion 21 has two tapering surfaces 28 provided on both ends thereof respectively at the axial ends of the outer wall member 20 so that the cell can be easily inserted into the conveying holder.

The cell holding portion 22 projecting inwardly from the center of the inner side of the elastic inner wall portion 21 has an arcuate cell holding surface 29 provided on the inner side thereof, of which curvature corresponds to the outer periphery of the cell 7. In particular, the cell holding surface 29 is arranged along a circle which is slightly smaller than the outer circumference of the cell 7. The above mentioned tapering surface 28 also extends at either end of the three cell holding portions 22 for helping smooth insertion of the cell 7 between the cell holding surfaces 29.

The deformation limiting boss 23 integrally formed on and projecting radially from the inner side of the outer wall member 20 toward the corresponding cell holding portion 22 is spaced at its distal end by a distance d from the outer side of the elastic inner wall portion 21, as shown in FIG. 2. The distance d may preferably be 0.1 to 0.6 mm. Accordingly, the elastic inner wall portion 21 can outwardly be deformed up to the distance d.

Figure 4:
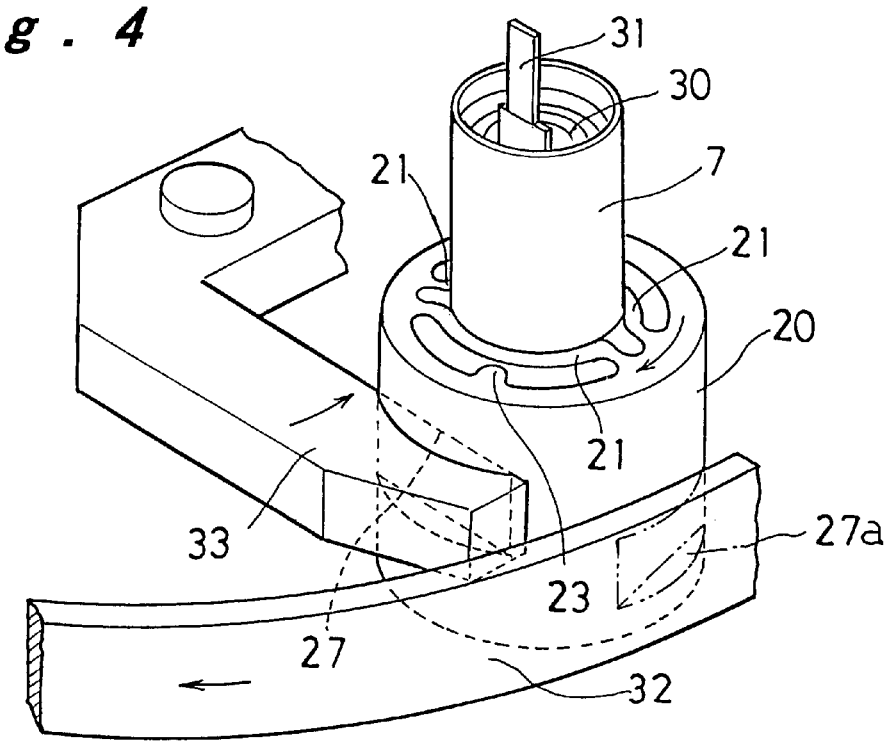
FIG. 4 is a perspective view showing positioning of the conveying holder.

The holding of a cell 7 in the conveying holder of this embodiment will be explained referring to FIG. 4. As shown in FIG. 4, the cell 7 in manufacturing process has a lead terminal 31 extending from an electrode assembly 30 thereof. As the cell 7 is not symmetrical about its axis, its orientation is determined by the lead terminal 31. More specifically, the cell 7 is inserted into the conveying holder with the lead terminal 31 positioned with respect to the recessed surface 27 of the conveying holder.

The cell 7 is smoothly inserted into the conveying holder, guided by the tapering surfaces 28 and then received by the cell holding surfaces 29 of the three cell holding portions 22. Since the cell holding surfaces 29 are located on the circle which is smaller than the outer periphery of the cell 7, their cell holding portions 22 causes the elastic inner wall portions 21 to be elastically deformed outwardly as the cell 7 moves in. Upon the cell 7 being fully inserted at its correct location in the conveying holder, the cell holding surfaces 29 press the outer periphery of the cell 7 by the resiliency of the elastic inner wall portions 21. This allows the cell 7 to be securely held at its correct location in the conveying holder by frictional forces between its outer wall and the cell holding surfaces 29.

The resilient force which is urged towards the center of the outer wall member 20 is aligned with the contacting direction of each cell holding surface 29 against the cell 7. Also, when the cell 7 has been loaded, the cell holding portions 22 are deformed outwardly in accordance with the true circle defined by their cell holding surfaces 29, equally increasing its diameter. In other words, as the cell holding portion 22 is deformed outwardly along the radial direction of the outer wall member 20, its resilient force remains aligned with the contacting direction of the cell holding surface 29 with the cell 7. Moreover, the cell 7 is held by equal holding strength from three different directions distanced at equal interval of 120 degrees. If the cell 7 were held from four or more equally separated directions, the holding strength might be unbalanced by variation of the periphery of the cell 7, causing unstableness in holding the cell 7. This embodiment ensures the holding of the cell 7 with the equal holding strength even with some variation of the shape and diameter of the cell 7.

In case that the cell 7 is inserted with its axis being eccentric to the conveying holder due to some error, any excessive dislocation more than the distance d of the elastic inner wall portions 21 is prevented by the deformation limiting bosses 23. Since the elastic deformation of each elastic inner wall portion 21 is prevented from exceeding its limit and the deformation of the cell 7 is maintained within the distance d in the conveying holder, any damage to or distortion on both the cell 7 and its conveying holder will be avoided.

Figure 6:
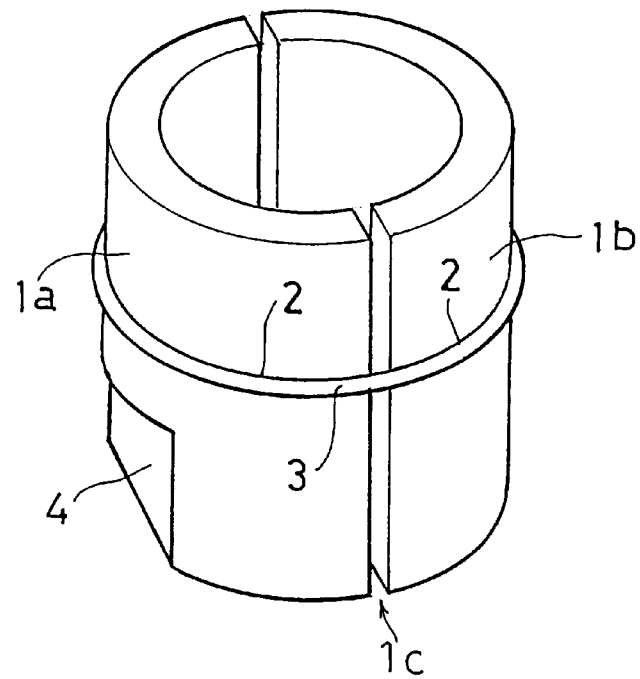
FIG. 6 is a perspective view of a conventional conveying holder for cylindrical cell.

The conveying holder of the embodiment has no troublesome projections and gaps as compared to the prior arrangement shown in FIG. 6 and will hardly be disturbed or interrupted by the feeder shoot or guide members during the conveying operation along the production line. Even when the conveying holder is slid with or collided against each other in a conveyor system or on a turn table, its strength of holding the cell 7 remains unchanged thus maintaining the cell 7 stable and fixed at its relative location and correct posture.

Therefore, the cell 7, once held at its correct position in the conveying holder, can easily be positioned at any succeeding step by detection of the recessed surface 27 of the conveying holder.

The action of conveying and positioning the conveying holder will be explained. As the conveying holder carries the cell 7 in its upright state as shown in FIG. 4, it is necessary to prevent the cell 7 from falling down in a transfer process. For that purpose, the two ring members 24 which are greater in specific gravity than the synthetic resin material are inserted in the outer wall member 20 proximately at both ends thereof. This permits the conveying holder to have a greater weight than that of the cell 7 and thus hold the cell 7 stably. A single ring member 24 may be inserted in the vicinity of the lower end of the outer wall member 20, in order to keep the gravity center of the conveying holder to be lower.

The conveying holder is easily centered with the help of an arcuate portion of its outer wall member 20 and orientated in relation to the cell 7 with the use of its recessed surface 27, whereby processing and assembling operations in the succeeding steps are facilitated. One example of means for positioning the conveying holder is now explained referring to FIG. 4. The conveying holder carrying the cell 7 in its upright state is introduced with its outer wall member 20 fitted into a holding groove of a semicircular shape in cross section (not shown) provided in the outer side of a turn table (not shown), and the location of its axial center relative to the turn table is detected. At the same time, the conveying holder is rotatably supported with the outer races of ball-bearings mounted to the bottom surface of the holding groove.

As shown in FIG. 4, the conveying holder is rotated directly on the ball-bearings by a flat belt 32 running on the opposite side of the ball-bearings and urged against the outer wall member 20. During the rotating movement, the outer wall member 20 of the conveying holder is pressed at its outer side with a positioning member 33 such as a lever which remains urged by a spring or the like in a direction shown by the arrow. As the positioning member 33 engages with the recessed surface 27 of the conveying holder being rotated, it comes into direct contact with the recessed surface 27 thus ceasing the rotation of the conveying holder.

Figure 7:
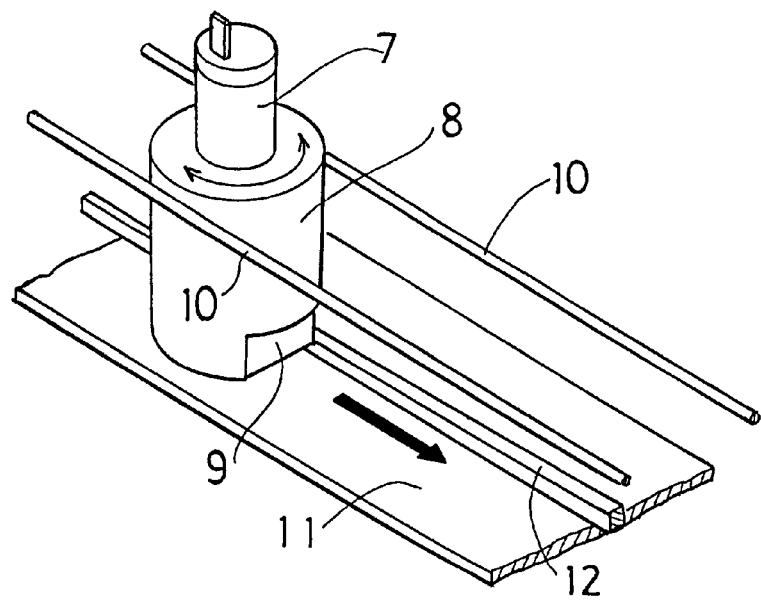
FIG. 7 is a perspective view showing a means for positioning the conventional conveying holder.

When the positioning member 33 engages with the recessed surface 27 of groove-like shape spaced by the distance from one end of the outer wall member 20, it securely holds the conveying holder limiting upward and downward movements hence preventing the conveying holder from lifting up during the movements as compared with the prior arrangement shown in FIG. 7. With the use of a magnetic conveyor system, carrier guides for transportation can be omitted, as the conveying holder can always be held at its correct position by a magnetic force of the conveyor system acting on the ring member 24 made of ferromagnetic material. The ring member 24 is smaller in thermal expansion factor and less affected by moisture in air than the resin material, thus contributing to the smaller dimensions of the conveying holder including the outer wall member 20.

A plurality of the recessed surfaces 27a as denoted by the two-dot chain lines in FIG. 4 may be provided on the outer wall member 20 at another point, by which it is possible to position the cell 7 at different points with the use of respective positioning members 33.

Figure 5:
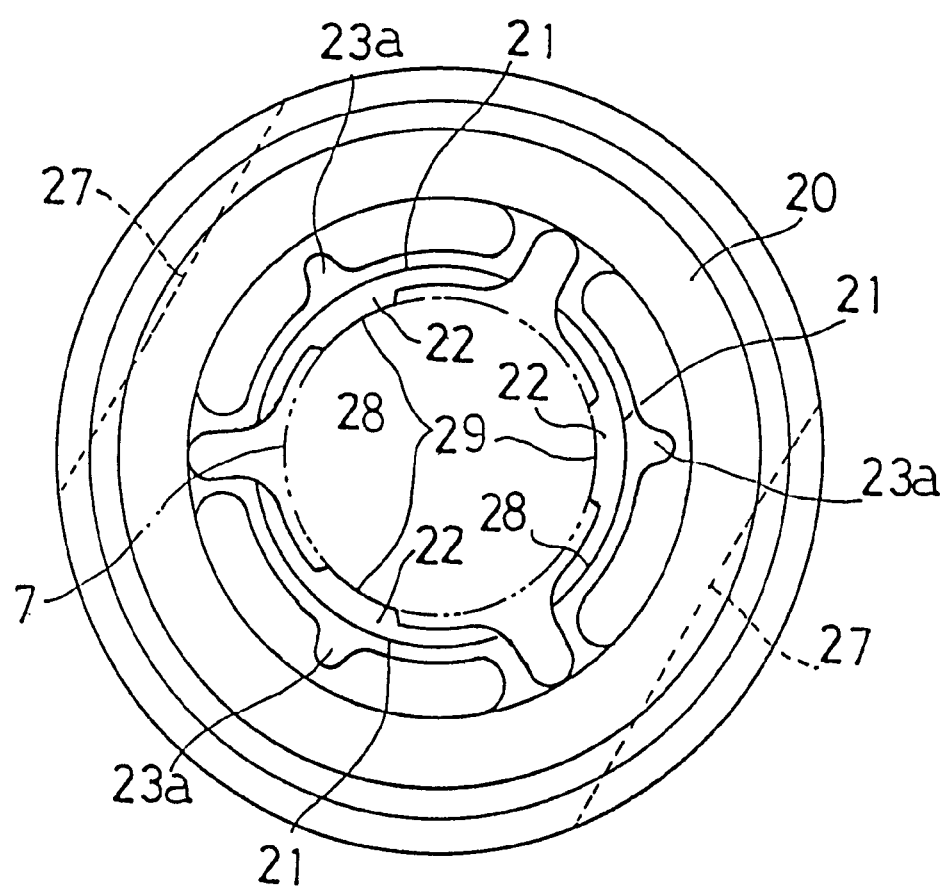
FIG. 5 is a plan view of a conveying holder for cylindrical cell according to another embodiment of the present invention.

The deformation limiting bosses 23 may not necessarily be provided on the outer wall member 20 as shown in FIG. 1. Referring to FIG. 5, each of the elastic inner wall portions 21 may have a deformation limiting boss 23a formed in the middle of the outer side thereof which is located radially opposite to the cell holding surface 29 of the cell holding portion 22 and spaced at its distal end by a distance from the inner side of the outer wall member 20 for yielding the same effect.

According to a first feature of the conveying holder for cylindrical cell of the present invention, the elastic inner wall portions provided with the cell holding portions are arranged concentric with the outer wall member therein. When a cell is inserted, the cell holding portions are deformed radially and outwardly due to the elastic deformation of the elastic inner wall portions and the resilient force of the elastic inner wall portions acting as a holding force on the cell holding portions is aligned with the contacting direction of the cell holding surfaces to the outer side of the cell. This allows the cell to be held stably by the cell holding surfaces with a constant holding force regardless of variation of the outer periphery of the cell.

According to a second feature of the conveying holder for cylindrical cell of the present invention, three or more elastic inner wall portions having their respective cell holding portions at the center of their inner side are provided. This allows the cell holding surfaces of the cell holding portions to hold under pressure the outer side of the cell at three or more different locations spaced at equal angular intervals, hence ensuring the holding of the cell at its correct position with higher stability.

According to a third feature of the conveying holder for cylindrical cell of the present invention, the deformation limiting bosses are provided to allow a space between their distal ends and the outer side of the corresponding elastic inner wall portions. This prevents the cell from being inserted with its axis being eccentric to the conveying holder by some error.

According to a fourth further feature of the conveying holder for cylindrical cell of the present invention, the locator recessed surface of the outer wall member is provided in the form of a groove by notching off a part thereof in parallel with a tangential direction on the outer side of the outer wall member spaced from one end. This allows the cell to be loaded as correctly positioned with relation to the recessed surface and the conveying holder to be conveyed in a correct orientation without the help of traditional guide bars.

According to a fifth feature of the conveying holder for cylindrical cell of the present invention, two or more recessed surfaces are provided on axially different points of the outer side of the outer wall member. This allows the conveying holder to be correctly positioned in different directions with the use of positioning members which can engage with their corresponding recessed surfaces on the outer wall member.

According to a sixth feature of the conveying holder for the cylindrical cell of the present invention, the whole body of the holder is monolithically formed of a synthetic resin material by molding. This allows the conveying holder to be reduced in production cost and increased in dimensional accuracy and physical strength.

According to a seventh feature of the conveying holder for cylindrical cell of the present invention, the ring member or disk made of ferromagnetic material which is greater in specific gravity than the synthetic resin is embedded close to one end of the outer wall member. When a magnetic conveyor is employed in the conveyor system, this allows the conveying holder to be conveyed while being securely held at a desired position by a magnetic force which acts on the ring member or disk of the conveying holder. With the employment of such conveyor system, the conveying holder can also be transferred vertically or in a tilted direction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A conveying holder for a cylindrical cell, which transfers a cylindrical cell inserted from an opening by means of a driving force of a conveyor system while maintaining the cell in an upright state, comprising:

an outer wall member having an inner circumferential surface which is greater in diameter than the cylindrical cell and a plurality of deformation limiting bosses extending inwardly from the inner circumferential surface;

a plurality of elastic inner wall portions concentrically arranged with respect to the outer wall member and spaced from the inner circumferential surface of the outer wall member, each elastic inner wall portion contacts the outer wall member, along its concentric arrangement, at two spaced locations; and a plurality of cell holding portions respectively projecting inwardly from an inner side of the elastic inner wall portions, each having a cell holding surface which corresponds to the contour of the cylindrical cell, in which the cylindrical cell is inserted into and tightly held between the cell holding surfaces which are positioned along a concentric circle having a smaller diameter than that of the cylindrical cell, one of the plurality of deformation limiting bosses is located radially opposite to each corresponding cell holding surface of each cell holding portion, each deformation limiting boss projects so that a distal end thereof is spaced by a distance from an outer side of the corresponding elastic inner wall portion.

2. A conveying holder for cylindrical cell according to claim 1, wherein three or more elastic inner wall portions of identical shape having their respective cell holding portions at the center on the inner side thereof are disposed at equal intervals along a circle being concentric with the outer wall member.

3. A conveying holder for cylindrical cell according to claim 1, wherein the outer wall member is provided with a recessed surface for positioning which is formed by cutting off a part of the outer wall member in a groove in parallel with a tangential direction and distanced from one end of the outer wall member.

4. A conveying holder for cylindrical cell according to claim 3, wherein the recessed surface is provided in plurality at different points on the outer side of the outer wall member.

5. A conveying holder for cylindrical cell according to claim 1, wherein the outer wall member, the elastic inner wall portions, the cell holding portions, and the deformation limiting bosses are integrally formed of synthetic resin by molding.

6. A conveying holder for cylindrical cell according to claim 5, wherein the outer wall member has a ring member or a disk made of ferromagnetic material being greater in specific gravity than synthetic resin and inserted at the vicinity of at least one end of the outer wall member.

* * * * *